(12) United States Patent
Kannegiesser et al.

(10) Patent No.: US 6,309,506 B1
(45) Date of Patent: Oct. 30, 2001

(54) METHOD AND DEVICE FOR JOINING PREFERABLY FLEXIBLE SURFACE STRUCTURES

(75) Inventors: Martin Kannegiesser, Bad Salzuflen; Jürgen Inselmann, Löhne, both of (DE)

(73) Assignee: Schaetti AG., Wallisellen (CH)

( * ) Notice: Subject to any disclaimer, the term of this patent is extended or adjusted under 35 U.S.C. 154(b) by 0 days.

(21) Appl. No.: 09/144,336

(22) Filed: Aug. 31, 1998

(30) Foreign Application Priority Data

Sep. 5, 1997 (DE) .............................. 197 39 042

(51) Int. Cl.⁷ .............................. B32B 31/08; B32B 31/12
(52) U.S. Cl. .................. 156/312; 156/324; 156/583.5
(58) Field of Search ................................. 156/312, 324, 156/583.5

(56) References Cited

U.S. PATENT DOCUMENTS

| | | | | |
|---|---|---|---|---|
| 3,236,714 | * | 2/1966 | Traut | 156/324 |
| 3,376,177 | * | 4/1968 | Bowser | 156/324 |
| 3,533,886 | | 10/1970 | Levitan et al. . | |
| 3,883,386 | * | 5/1975 | Garbini | 156/380 |
| 3,951,713 | * | 4/1976 | Emmel | 156/312 |
| 4,897,147 | * | 1/1990 | Inselmann | 156/324.4 |
| 4,997,507 | * | 3/1991 | Meyer | 156/324 |
| 5,131,973 | * | 7/1992 | Feldkamper | 156/555 |
| 5,470,411 | * | 11/1995 | Gloton | 156/64 |
| 5,501,764 | * | 3/1996 | Inselmann | 156/583.5 |
| 5,846,363 | * | 12/1998 | Haverkamp | 156/106 |

FOREIGN PATENT DOCUMENTS

| | | |
|---|---|---|
| 2 111 408 | 7/1983 | (BG) . |
| 2214517 | 10/1972 | (DE) . |
| 2948989 | 3/1981 | (DE) . |
| 87 10 695 | 11/1987 | (DE) . |
| 3737202 | 5/1989 | (DE) . |
| 4215028 | * 3/1994 | (DE) . |
| 4236211 | 4/1994 | (DE) . |
| 3502608 | * 8/1996 | (DE) . |
| 195 26 912 | 1/1997 | (DE) . |
| 196 04 726 | 8/1997 | (DE) . |
| 598 960 | 6/1994 | (EP) . |
| 350 982 | 6/1905 | (FR) . |
| WO 92 15118 | 9/1992 | (WO) . |

\* cited by examiner

Primary Examiner—Steven D. Maki
(74) Attorney, Agent, or Firm—Sughrue, Mion, Zinn, Macpeak & Seas, PLLC

(57) ABSTRACT

Flexible surface structures (21, 22, 27) are often glued to one another with the application of pressure and heat. Known laminating devices for this purpose are limited in their efficiency. If greater laminating efficiency is to be achieved, an existing laminating device has to be exchanged for a more powerful laminating device. The invention proposes a laminating device constructed in modular fashion and having a plurality of successive laminating stations (12, 14). In this way, the laminating efficiency can be increased by adding new laminating stations (12, 14) to already existing laminating stations (12, 14) which thus do not need to be replaced. In addition, it is proposed that a drying station (17) be provided between successive laminating stations (12, 14), in which drying station the surface structures (21, 22) laminated in the first laminating station (12) are dried before they are joined with a further surface structure (27) in the succeeding second laminating station (14).

12 Claims, 2 Drawing Sheets

METHOD AND DEVICE FOR JOINING PREFERABLY FLEXIBLE SURFACE STRUCTURES

BACKGROUND OF THE INVENTION

The invention relates to a method for joining preferably flexible surface structures.

The invention relates to joining flexible surface structures by gluing. For the gluing, an adhesive mass is used which generally itself has the form of a surface structure. However, it is also conceivable that the adhesive mass should be already allocated in some other manner to one or a plurality of the surface structures to be joined.

The gluing takes place by the application of heat and pressure, the adhesive mass, plasticised by the heat, partially penetrating into the surface structures to be joined and thus effecting the bond between same. In technical jargon, this type of joining of surface structures is also referred to as laminating.

The surface structures in question are generally textile surface structures. However they can also be surface structures made of some other nonwoven material, for example foils, nets or mats. The surface structures to be joined are generally present in web form. However it is also conceivable that at least some of the surface structures should be processed already cut to size.

Devices for joining flexible surface structures are known which have a single laminating station with two circulating conveyor belts, the surface structures to be joined being conveyed between the facing bights of the conveyor belts through the laminating station. In the region of the laminating station, there is located a heating station by means of which the adhesive mass is activated and the surface structures to be joined are heated up. Following the heating station there is a pressing device, with which the surface structures to be joined are pressed together, the previously plasticised adhesive mass penetrating at least partially into the surface structures to be joined.

The known laminating stations only permit limited laminating efficiency. If greater laminating efficiency is required, a correspondingly larger and more powerful laminating station must be used whose laminating capacity is in many cases not fully exploited. This leads to uneconomic operation of laminating stations of this type.

SUMMARY OF THE INVENTION

Proceeding from this, the purpose underlying the invention is to create a method and a device for joining, especially laminating, flexible surface structures, by means of which flexible and yet economic operation is guaranteed.

According to this, method the joining of the surface structures takes place in the course of a plurality of stations which succeed one another in the conveying direction and/or in the direction of handling. Through the arrangement of the stations in succession, it is possible to configure same as independent units, by which means the method makes it possible to form a laminating line for joining the surface structures, which meets the requirements. The individual stations make it possible for the laminating line to be extended as needed, and this makes possible increased efficiency of the same whilst using previous stations.

As a development of the method, provision is made for reducing at least the moisture content of some surface structures, between successive thermal treatments in corresponding stations (laminating stations). This is possible in particular as a result of the arrangement in succession, according to the invention, of individual, preferably independent, stations, by corresponding space being formed between the stations, which is necessary in order to remove moisture or the like from at least some of the surface structures to an adequate extent, before these surface structures are preferably treated thermally in the next station.

Provision is also made for at least one station, especially a station following after a first station, optionally to be operated in such a way that the surface structures are either warmed or cooled or both warmed and cooled by it. By this means, the laminating line composed of the successive stations, obtains further improved flexibility, because a station of this sort (or even a plurality of stations), which is not currently needed for warming up the surface structures, can be used to increase efficiency by cooling the surface structures which are joined together by laminating.

According to a further development of the method, at least one surface structure is supplied between successive stations. This surface structure then does not run through the previous station or a plurality of stations placed in front of it. In this way, surface structures of different sensitivity can be processed and if necessary different joining techniques can be used.

According to an advantageous further development of the method, provision is made for taking the web-like surface structures out of engagement with the or each conveyor belt between at least two stations. The outer sides of the textile surface structures lie exposed between successive stations. This is favourable to cooling and evaporation of the surface structures treated in the previous station. In particular, effective reduction in the moistness of the surface structures lying exposed between successive stations is possible in this way.

According to the method, provision is additionally made for ascertaining the tension of at least one of the web-shaped surface structures between two successive stations. On the basis of the tension of at least one surface structure ascertained between successive stations, the conveying speed of the surface structures can be so controlled that the tension of the web of the textile surface structure is adjusted to the adhesive mass in such a way that the latter can penetrate the surface structures to sufficient depth. In addition, compression and smoothing effects of the web-shaped surface structure can be achieved through the web tension.

According to the device of the invention, through the fact that at least two successive, independent laminating stations are provided according to the invention, it is possible to extend the device as needed. If the full capacity of the device is not needed, one laminating station can remain switched off, which produces a saving in energy.

According to a preferred development of the device, a drying station is disposed at least between two successive laminating stations. This drying station can be simply accommodated between the individual successive laminating stations. Moreover, drying the surface structures leaving a laminating station improves the efficiency of a following laminating station. In addition to this, higher processing speeds can be achieved by the successive, sectional laminating with drying steps interspersed, such that the laminating efficiency with successive laminating stations is higher than that with a laminating station having the same capacity as the individual successive laminating stations.

Preferably only one conveyor belt, preferably a lower one, is present in the region of the drying station. By this means, the surface structures are uncovered on their upper side, such that moisture can be removed effectively from them in the drying station. The efficiency of the drying station can be further increased if, in the region of same, according to an advantageous development of the invention, the flexible surface structure is deflected away from the lower conveyor belt. Then the web-shaped surface structures (or even just a single web-shaped surface structure) are free on both sides, which permits more efficient dehumidification and vaporisation in the region of the drying station.

According to a further advantageous development of the device, a measuring station is provided between at least two laminating stations which succeed one another at a spacing. The measuring station serves to ascertain the tensile force of the web consisting of at least one surface structure, preferably of a plurality of surface structures which are already glued to one another, and if necessary to alter it in such a way that the web is transported at least through the next laminating station with a certain internal tension, which serves especially to smooth the plasticised adhesive mass and to control the depth to which it penetrates into the surface structures.

The measuring station is preferably formed from three rollers running at a spacing parallel to one another and which are disposed on a common laminating station securely in the region of the measuring station between two successive laminating stations. Two rollers are preferably configured as guide rollers, between which the third roller, configured as a measuring roller is disposed, in such a way that it moves the web of the surface structures out of the plane of the two outer guide rollers. In this process, a bearing force is generated on the bearings of the measuring roller, which is detected and passed on to a device, preferably a microcomputer or the like, the device controlling, in dependence on the measuring values detected on the measuring roller and the pre-determined web tensions, the succeeding laminating station, especially in respect of the conveying speed of the surface structures.

According to a preferred development of the device, the measuring station is allocated to the drying station between two successive laminating stations, the guide rollers of the measuring station especially serving simultaneously to deflect the web of the textile surface structure away from the lower conveyor belt, such that the web lies exposed on both sides.

BRIEF DESCRIPTION OF THE DRAWINGS

Embodiments, given by way of example, of the device and method according to the invention, are explained in greater detail below with the aid of the drawing. In this the figures show.

DETAILED DESCRIPTION OF THE INVENTION

Figure 1:
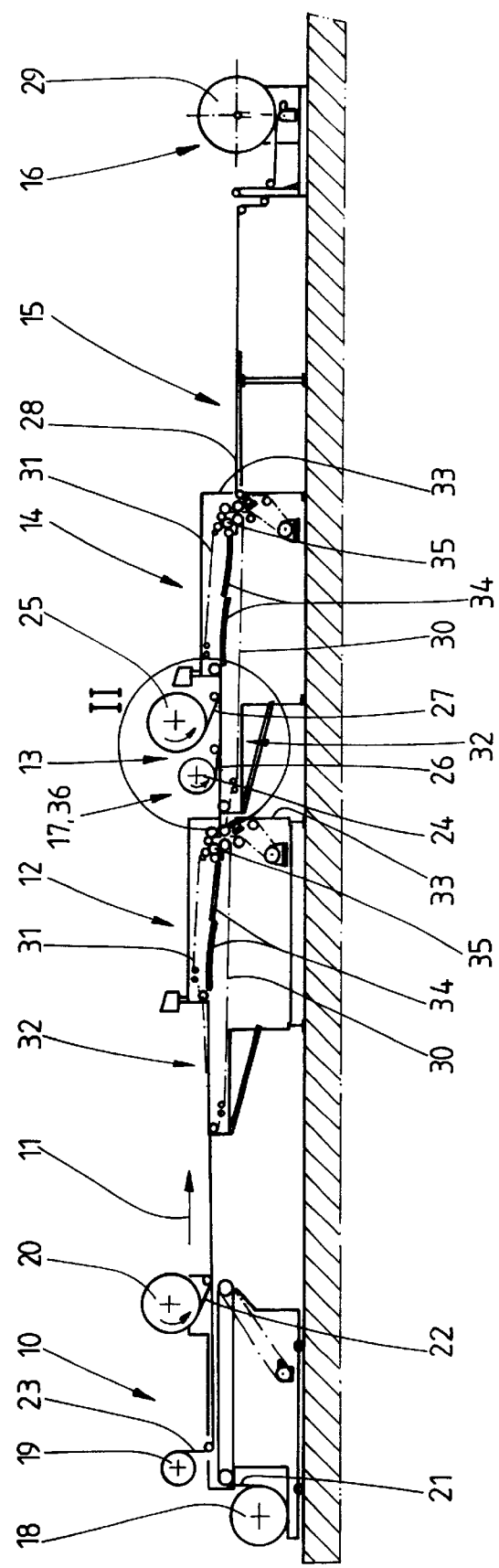
FIG. 1 a diagrammatic side view of the device.

The device shown here relates to a laminating line for gluing together at least partially web-shaped flexible surface structures. The gluing of the surface structures takes place with the application of heat and pressure through a plasticised adhesive mass, which can be supplied to the surface structures to be joined, if necessary also as a web-shaped surface structure. These surface structures can be both textile surface structures and also nonwoven surface structures, for example foils, nets or mats.

The laminating line shown here has a take-off station 10, succeeded by, in the treatment direction, especially in the laminating direction 11, a first laminating station 12, a second take-off station 13, a second laminating station 14, an air-cooling station 15 and a take-up station 16.

A drying station 17 is disposed between the successive laminating stations 12 and 14, approximately in the region of the second take-off station 13.

The laminating line, shown here by way of example, has in the region of the first take-off station 10, three supply rolls 18, 19, 20, from each of which a web-shaped surface structure is uncoiled in the laminating direction 11. The supply rolls 18 and 20 have the external surface structures 21 and 22 which are to be joined. From supply roll 19, a central surface structure 23 is uncoiled which is preferably the web-shaped adhesive agent for gluing the outer surface structures 21, 22. This central surface structure 23, after gluing together the outer surface structures 21 and 22, merges into same, is therefore thereafter practically no longer present as a separate surface structure 23 between the outer surface structures 21 and 22.

In the embodiment shown, two additional supply rolls 24, 25 are allocated to the second take-off station 13 between the successive laminating stations 12 and 14, and from these additional rolls two further web-shaped surface structures 26 and 27 may be drawn. The external surface structure 27, coming from supply roll 25, can be of a type that can be additionally glued to the surface structures 21 and 22. This gluing takes place by means of the surface structure 26 coming from supply roll 24, which can again be a web-shaped adhesive material. Surface structure 26 also loses its independent nature after surface structure 27 has been glued to surface structure 22, by, as it were, breaking up between surface structures 22 and 27. The second laminating station 14 therefore leaves one laminate web 28 out of the three surface structures 21, 22 and 27 which have been joined to one another. This laminate web 28 is taken up in the take-up station 16 on a supply roll 29.

The two laminating stations 12 and 14 are, on the laminating line shown here, configured substantially identical. The structure of the first laminating station 12 is described below. This description is also applicable to the second laminating station 14, identical reference numbers being used for identical parts.

The laminating station 12 has a lower conveyor belt 30 and an upper conveyor belt 31. The upper conveyor belt 31 only extends over a portion of the length of the lower conveyor belt 30. In the embodiment shown, the upper conveyor belt 30 covers slightly more than half the length of the lower conveyor belt 31. The lower conveyor belt 30 projects on a feed side 32, lying in front in the direction of lamination 11, in relation to the upper conveyor belt 31. On a runout side 33 of the laminating station 12, lying behind in the direction of lamination 11, the ends of the upper conveyor belt 31 and of the lower conveyor belt 30 lie approximately above one another. Preferably, both conveyor belts 30 and 31 are driven synchronously, the web-shaped surface structures, here surface structures 21, 22 and 23, being here conveyed between the facing bights of the lower conveyor belt 30 and of the upper conveyor belt 31 through the laminating station 12.

The laminating station 12 has in its interior, approximately along a portion of the shorter upper conveyor belt 31, a heating device 34, which is succeeded by a pressing device 35 in the direction of lamination 11. The heating station 34, the pressing device 35 and also the remaining design of the laminating station 12 are known as such, for example from DE 35 02 608 C2 and DE 42 15 028 C2.

Figure 2:
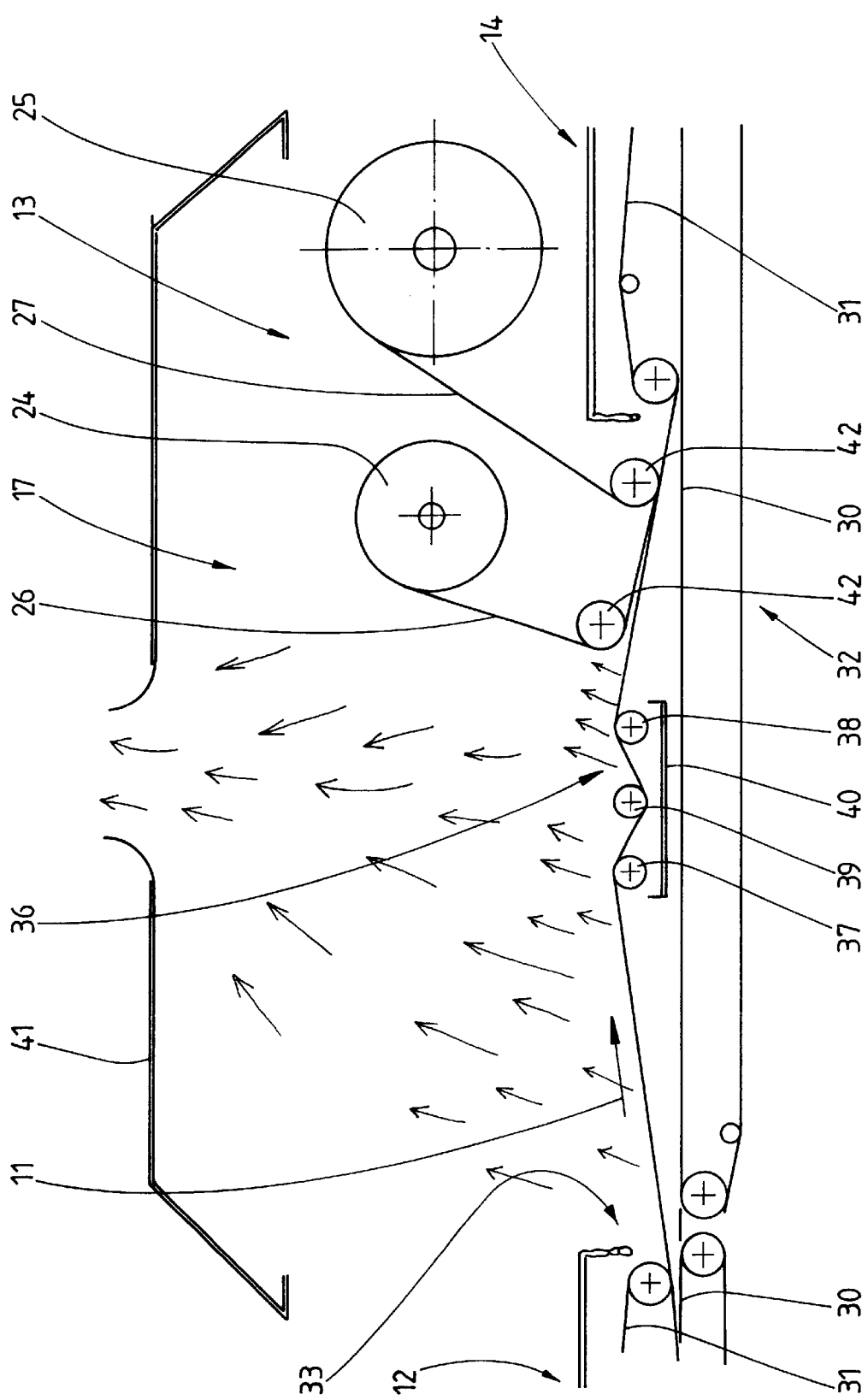
FIG. 2 an enlarged detail II from FIG. 1 in the region of a drying station between two successive laminating stations.

The second laminating station 14 is disposed behind the first laminating station 12 in such a way that the lower (longer) conveyor belt 30, projecting on the feed side 32 in relation to the upper (shorter) conveyor belt 31, succeeds the lower conveyor belt 30 of the first laminating station 12. The lower conveyor belts 30 of the two laminating stations 12 and 14 thus form a continuous conveying distance for the surface structures 21, 22 and 23. Because the upper conveyor belt 31 is shorter, between the successive laminating stations 12 and 14 there is a region in which the surface structures 21, 22 and 23 are not covered on their upper side, i.e. lie exposed. In this region, i.e. on the feed side 32 of the second laminating station 14, is located the drying station 17. on the device shown here, there is associated with the drying station 17 simultaneously the second take-off station 13 and a measuring station 36 (FIG. 2).

The measuring station 36 is located approximately in the middle between the ends of the upper conveyor belt 31 and the lower conveyor belt 30 of the first laminating station 12 and of the upper conveyor belt 31 of the second laminating station 14. The measuring station 36 is formed from three parallel rollers running transversely to the direction of lamination 11. These are two outer guide rollers 37, 38 and a measuring roller 39 disposed in the middle between same. Opposite ends of the guide rollers 37, 38 and of the measuring roller 39 are mounted in a fixed frame of the measuring station 36, this frame not being shown in FIG. 2. Preferably, the longitudinal central axes of the guide rollers 37, 38 and of the measuring roller 39 lie in a common horizontal plane. Only the surface structures 21, 22 and 23 coming from the first laminating station 12 pass through the measuring station 36, in such a way that the surface structures 21, 22 and 23 run along over the guide rollers 37, 38 but pass the central measuring roller 39 on the lower side. In this way, the web of the surface structures 21, 22, 23 is deflected from the measuring roller 39 roughly in a triangular shape out of its plane between the guide rollers 37, 38, as a result of which the tension of the web of the surface structures 21, 22, 23 brings an upwardly directed reaction force to bear on the measuring roller 39. This is detected on at least one bearing of the measuring roller 39 by a corresponding force transducer.

Each force transducer of the measuring roller 39 is connected with a control system of at least the second laminating station 14, in such a way that the measurement signals of each transducer of the measuring roller 39 is converted in the control system into signals which correspond to the tensile stress of the web of the surface structures 21, 22, 23. In this way, the control system of at least the second laminating station 14 receives information about the current tension in the web of the surface structures 21, 22, 23 in the measuring station 36. This web tension can be made to conform with a desired web tension recorded in the control system, by the control system monitoring the drive of the upper conveyor belt 31 and of the lower conveyor belt 30 of the second laminating station 14 and setting or adjusting its speed correspondingly.

The measuring station 36 in conjunction with a corresponding control or regulating system for the drive speeds of the conveyor belts 30 and 31 of the second laminating station 14 make it possible to set the treatment of surface structures 21, 22, 23, 26 and 27, which takes place in this laminating station, individually to the respective adhesive agent and to the material of the surface structures 21, 22 and 27 which are to be joined. In addition to this, special compression and smoothing effects of the surface structures 21, 22 and 27 can be achieved.

The longitudinal central axes of the guide rollers 37, 38 and of the measuring roller 39 are disposed with such spacing above the upper bight of the upper conveyor belt 31 of the second laminating station 14, that neither the guide rollers 37, 38 nor the measuring roller 39 are adjacent to the upper bight of the upper conveyor belt 31; rather, a gap occurs between the guide rollers 37, 38 and the measuring roller 39 and the upper bight of the upper conveyor belt 31. In this gap is disposed, below the guide rollers 37, 38 and the measuring roller 39, a collecting trough 40 for fluid or the like dripping from the surface structures 20, 22, 23 in the region of the measuring station 36.

Through the fact that the guide rollers 37, 38 and the measuring roller 39 are arranged at a spacing above the upper conveyor belt 31, in the measuring station 36 the web of the surface structures 21, 22, 23 is raised from the guide rollers 37, 38 and the measuring roller 39 away from the upper bight of the lower conveyor belt 30 of the second laminating station 14, such that in the region of the upper conveyor belts 31, succeeding one another at a spacing, of the laminating stations 12 and 14, the web of the surface structures 21, 22, 23 is exposed on both sides which means that a finish can be vaporised and moisture can escape. The escaping moisture and finish is led away by an extraction hood 41 above the feed side 32 of the second laminating station 14 which is left free in the region of the drying station 17 by the upper conveyor belts 30.

After the measuring station 36, but before the upper conveyor belt 31 of the second laminating station 14, there are disposed deflection rollers 42 from which the web-shaped surface structures 26 and 27, which are uncoiled from the supply rolls 24 and 25 of the second take-off station 13, are led from above to the web of the surface structures 21, 22 and 23 which have already been laminated in the first laminating station 12. The two surface structures 21 and 22 then run into the feed side 32 of the second laminating station 14 along with the surface structure 23 which has broken up between surface structures 21 and 22 during the previous lamination in the laminating station 12, as well as the surface structures 26 and 27 supplied before the second laminating station 14.

After leaving the second laminating station 14, the finished laminate web 28 is cooled in the air-cooling station 15 and rolled up onto the supply roll 29 in the take-up station 16.

The web tension in the first laminating station 12 can be controlled or adjusted by unrolling the surface structures 21, 22 and 23 in the first take-off station 10. similarly, the web tension of the finished laminate web 28 in the drying station 17 behind the second laminating station 14 can be controlled or adjusted by the take-up speed of the laminate web 28 on the supply roll 29 in the take-up station 16.

The invention is suitable for laminating lines which have more than two laminating stations and where more than two surface structures may be glued at the same time in the laminating stations. As an alternative to the method described above, it is also possible with the laminating station according to the invention to glue together surface structures which have been cut to size.

Finally, it is also possible to imagine providing between two or more than two successive laminating stations with either a measuring station or a drying station, or only a measuring station or only a drying station. Where there are more than two successive laminating stations it is also conceivable not to arrange a drying station and/or a measuring station between all the successive laminating stations.

The method according to the invention works with the device described above substantially as follows:

The webs of the outer surface structures 21 and 22 which are to be joined together, coming from the first take-off station 10, and of the surface structure 23 lying between same and having the adhesive mass serving to glue the surfaces, run in the laminating direction 11 on the feed side 32 into the first laminating station 12. The surface structures 21, 22 and 23 are transported between the facing bights of the conveyor belts 30 and 31 through the first laminating station 12 and in so doing are heated up in the heating device 34 and glued to one another in the pressing device 35, namely laminated. In this process, the central surface structure 23 serving to supply the adhesive agent breaks up into surface structures 21 and 22 by the adhesive agent partially penetrating these surface structures 21 and 22 and thus joining them together. with same. on the runout side 33, thus practically only a partially finished laminate web consisting of the outer surface structures 21 and 22, joined to one another, leaves the first laminating station 12. This partially laminated web then runs through the drying station 17 with the measuring station 36 behind the first laminating station 12 and in front of the second laminating station 14.

Because the upper conveyor belts 31 of the laminating stations 12 and 14, disposed behind one another, succeed one another at a spacing, the upper side of the partially finished laminate web, consisting of the surface structures 21 and 22, is exposed in the region of the drying station 17 and the measuring station 36. In addition to this, in the region of the measuring station 36, the partially finished laminate web, consisting of the surface structures 21 and 22, is deflected from the guide rollers 37 and 38 and the measuring roller 39 and is also deflected away from the lower conveyor belt 30 of the second laminating station 14, namely raised in relation to the upper bight of the lower conveyor belt, as a result of which the lower side of the partially finished laminate web consisting of the surface structures 21 and 22 lies exposed. Thus, in the region of the drying station 17, on the laminate web of the surface structures 22 and 23, exposed on all sides, the finish and moisture can at least partially escape and be led away via the extraction hood 41 or via the collecting trough 40 in liquid and/or gas form. Because the partially finished laminate web is lifted from the lower conveyor belt 30, no condensation can form on the latter. Thus the surface structures 21 and 22, as they run into the second laminating station 14, can be embedded between dry conveyor belts 30 and 31. Moreover, the surface structures 26 and 27, supplied from the second take-off station 13 and still untreated, can be brought together with dry surface structures 21 and 22. This bringing together of the surface structures 26 and 27, supplied at the second take-off station 13, with the surface structures 21 and 22 which have already been glued together in the first laminating station 12, takes place between the measuring station 36 and the feed side 32 of the second laminating station 14, at the deflection rollers 42. In this process, the surface structure 26, serving to supply the adhesive agent, comes to rest on the upper side of the surface structure 22. Above surface structure 26 with the adhesive agent, there is located the surface structure 27 which is to be joined to surface structures 21 and 22 subsequently in the second laminating station 14.

The measuring station 36 detects the tension of the web-shaped surface structures 21 and 22 between the laminating stations 12 and 14. To this end, measuring signals detected at the force transducers of the measuring roller 39 are converted by a computing device of the control system into signals which are proportional to the web tension, and compared with the web tension recorded in the control system. Through corresponding control or adjustment of the speed of the conveyor belts 30 and 31 of the second laminating station 14, the web tension of the surface structures 21 and 22 between the laminating stations 12 and 14 can be brought to a pre-determined value which corresponds to requirements.

The separate laminating stations 12 and 14 make it possible to apply different temperatures to the surface structures in the heating devices 34. In particular it is possible in the first laminating station 12 to apply higher temperatures to the surface structures 21, 22 and 23 than in the second laminating station 14. By this means, surface structures 26 and 27 which are more sensitive to temperature can be processed in the second laminating station 14. For this reason, the device is generally operated in such a way that the heating device 34 of the first laminating station 12 works with higher temperatures than the heating device 34 of the second laminating station 14.

The first laminating station 12 is, if the surface structures 21 and 22 to be glued in it permit this, operated at as high a temperature as possible in the heating device 34, in order to speed up the vaporising of finish and moisture in the surface structures 21, 22 and 23 in the following drying station 17. Here, the temperature in the heating device 34 is chosen to be such that only after the surface structures 21, 22 and 23 have run through the pressing device 35 do they begin to emit moisture and the finish. The vaporising between the laminating stations 12 and 14 leads, moreover, to the fact that at least the surface structures 21 and 22 in the second laminating station 14 have a minimal residual moisture which guarantees effective lamination of surface structures 21 and 22, especially of surface structure 22, with the (third) surface structure 23 which is only supplied in front of the second laminating station 14. In addition, the reduced moisture in the surface structures 21 and 22 makes possible gluing in the second laminating station 14 at reduced temperatures, by which means surface structures 27 which are sensitive to temperature can be glued in the second laminating station 14.

What is claimed is:

1. In a method of joining flexible surface structures to one another while heat and pressure are applied to said surface structures during a continuous transport thereof in a direction, the improvement which comprises:

thermally treating said surface structures at a plurality of laminating stations succeeding one another in the direction of said transport by an underlying belt conveyor; and between successive stations: lifting at least one surface structure from the belt conveyor, and reducing moisture content of the at least one surface structure.

2. The method according to claim 1 wherein the surface structures are subjected in the successive stations to thermal treatments at different temperatures.

3. The method according to claim 1, wherein the surface structures are always only heated in a first one of said stations, and in a subsequent one of said stations, the surface structures are either heated or cooled.

4. The method according to claim 1, further comprising:
joining the structures to one another to form a laminate; and between two of said successive stations, joining at least one additional flexible surface structure to said laminate.

5. The method according to claim 1, further comprising detecting tension in a web of at least one of said surface structures between first (12) and second (14) ones of said successive stations.

6. The method according to claim 5 wherein a speed of an upper and/or lower conveyor belt transporting, the web in said second station is controlled in dependence on the detected web tension.

7. In a method of joining flexible surface structures to one another while heat and pressure are applied to said surface structures during a continuous transport thereof in a direction, the improvement which comprises:

transporting the structures by an underlying belt conveyor;

thermally treating said surface structures at a plurality of stations succeeding one another in the direction of said transport; and during said continuous transport, lifting and holding, only by deflecting means, at least one of said surface structures away from the belt conveyor.

8. The method according to claim 7 wherein the belt conveyor comprises two conveyor belts which succeed one another at a spacing in the successive stations, and wherein the surface structures are raised away from one of said conveyor belts.

9. The method according to claim 7, wherein the surface structures are always only heated in a first one of said stations, and in a subsequent one of said stations, the surface structures are either heated or cooled.

10. The method according to claim 7, further comprising:

joining the structures to one another to form a laminate; and between two of said successive stations, joining at least one additional flexible surface structure to said laminate.

11. The method according to claim 7, further comprising detecting tension in a web of at least one of said surface structures between first (12) and second (14) ones of said successive stations.

12. The method according to claim 11, characterized in that the speed at least of a following station is controlled in dependence of the detected web tension of the or each web-shaped surface structure (21, 22).

* * * * *